United States Patent
Zhang (10) Patent No.: US 9,106,932 B2
(45) Date of Patent: Aug. 11, 2015

(54) PARALLEL PYRAMID ENTROPY CODING FOR VIDEO AND IMAGE COMPRESSION

(75) Inventor: Lei Zhang, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 496 days.

(21) Appl. No.: 13/408,404

(22) Filed: Feb. 29, 2012

(65) Prior Publication Data

US 2013/0223536 A1    Aug. 29, 2013

(51) Int. Cl.
*H04N 11/02*  (2006.01)
*H04N 19/91*  (2014.01)
*H04N 19/13*  (2014.01)

(52) U.S. Cl.
CPC .............. *H04N 19/91* (2014.11); *H04N 19/13* (2014.11); *H04N 19/00121* (2013.01); *H04N 19/00951* (2013.01)

(58) Field of Classification Search
CPC .................. H04N 19/00121; H04N 19/00951; H04N 19/91; H04N 19/13
USPC ............................ 375/240.24, 240.12, 240.16
See application file for complete search history.

(56) References Cited

U.S. PATENT DOCUMENTS

| | | | |
|---|---|---|---|
| 8,718,140 B1* | 5/2014 | Cai et al. .................. | 375/240.16 |
| 2011/0091121 A1* | 4/2011 | Fukuhara et al. ............. | 382/234 |
| 2012/0014436 A1* | 1/2012 | Segall et al. ............. | 375/240.12 |

OTHER PUBLICATIONS

Richardson, "The H.264 Advanced Video Compression Standard", Second Edition, pub. Aug. 9, 2010.*

* cited by examiner

*Primary Examiner* — Gims Philippe
*Assistant Examiner* — Benjamin Pezzner
(74) *Attorney, Agent, or Firm* — Sterne, Kessler, Goldstein & Fox P.L.L.C.

(57) ABSTRACT

Methods, systems, and computer program products are provided to divide code blocks, such as blocks of quantized coefficient of image or video data, into smaller blocks and sub-blocks that can be processed in parallel using layered entropy coding and decoding scheme. This division is accomplished while still encoding the entire code block using the same layered entropy coding scheme.

20 Claims, 6 Drawing Sheets

PARALLEL PYRAMID ENTROPY CODING FOR VIDEO AND IMAGE COMPRESSION

BACKGROUND

1. Field

The present disclosure relates generally to video processing and, more particularly, to video coding techniques.

2. Related Art

Many processes in video coding involve processing of serial bit streams. These processes are themselves bound to serial operation in order to encode or decode the bit streams, requiring powerful processors to do so efficiently.

In particular, when working with serial data, clock speed becomes a limiting factor. If each piece of data must be processed before the next piece of data can be resolved, system speed can be increased (often linearly) by increasing processing clock speed. However, high clock speeds require additional power consumption and heat dissipation.

Accordingly, what is desired is a parallelizable coding technique.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the relevant art to make and use disclosed embodiments.

Embodiments of the disclosure will be described in detail with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description refers to the accompanying drawings that illustrate exemplary embodiments. Other embodiments are possible, and modifications can be made to the embodiments within the spirit and scope of the disclosure. Therefore, the detailed description is not meant to limit the invention. Rather, the scope of the invention is defined by the appended claims.

It would be apparent to one of skill in the art that the disclosure can be implemented in many different embodiments of software, hardware, firmware, and/or the entities illustrated in the figures. Any actual software code with the specialized control of hardware to implement the present disclosure is not limiting of the present disclosure. Thus, the operational behavior of the present disclosure will be described with the understanding that modifications and variations of the embodiments are possible, and within the scope and spirit of the present disclosure.

Reference to modules in this specification and the claims means any combination of hardware, firmware, or software components for performing the indicated function. A module need not be a rigidly defined entity, such that several modules may overlap hardware and software components in functionality. For example, a software module may refer to a single line of code within a procedure, the procedure itself being a separate software module. One skilled in the relevant arts will understand that the functionality of modules may be defined in accordance with a number of stylistic or performance-optimizing techniques, for example.

According to disclosed embodiments there are provided methods, computer-readable storage devices, and systems for dividing a code block into pixel groups, dividing the pixel groups into sub-blocks, and encoding pixels assigned to the sub-blocks using an encoding scheme for the code block.

Further features and advantages of the disclosure, as well as the structure and operation of various embodiments of the disclosure, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

Figure 1:
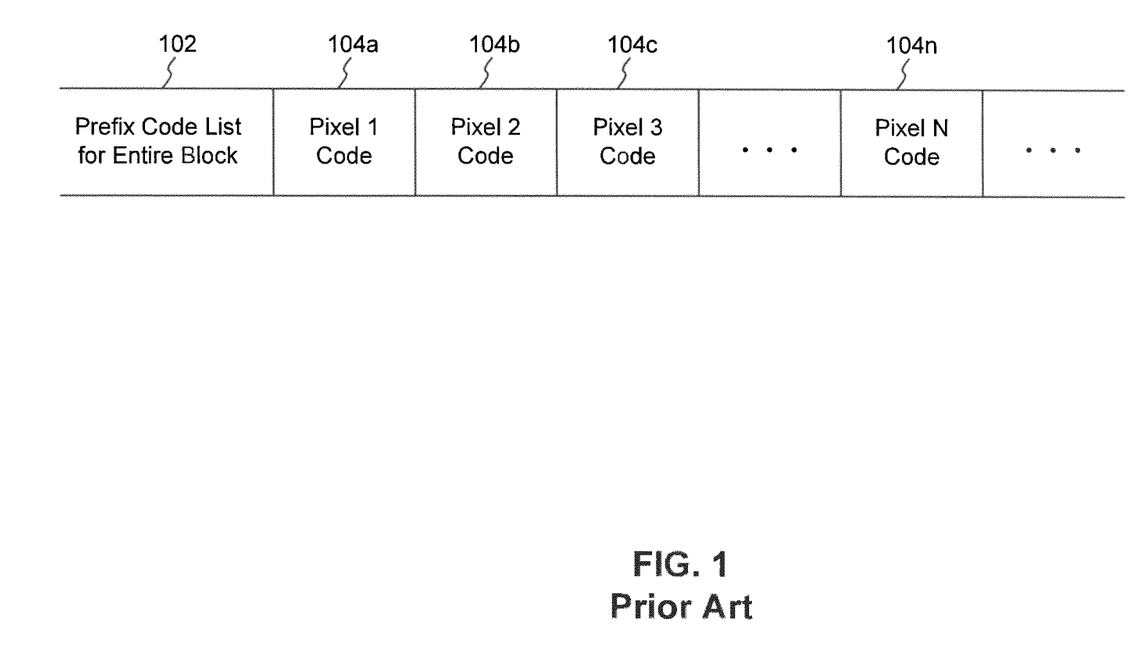
FIG. 1 illustrates an exemplary entropy coding standard.

FIG. 1 illustrates an exemplary entropy coding standard 100. Entropy coding, such as Huffman coding, is a lossless data compression technique that relies on a corresponding variable-length prefix-free codeword (or simply "code") to represent each fixed-length input. For example, as shown in coding standard 100, a set of pixels 104*a*, 104*b*, 104*c*, 104*n* (collectively pixels 104) are provided in a data stream. Each pixel might be represented, for example, by 24-bits of data comprising color intensity information for that pixel (e.g., 8 bits of data for red, 8 bits of data for green, 8 bits of data for blue). However, while 24-bits of data can represent 16.78 million different values, a block of pixels (e.g., a 16×16 pixel area within a picture) would only at most have one distinct value per pixel (e.g., 256 possible values). Moreover, some repetition is likely, in particular after lossy compression algorithms have been applied (e.g., by reducing the number of unique values to which the pixel data can resolve), meaning that some pixels may have identical quantized coefficient values.

Assuming, for example, that all of the pixels within a 16×16 pixel block have a color selected from a palette of only three possible colors. In that case, entropy coding could represent the three possible values using only a maximum of two bits of data (e.g. '00'=red, '01'=blue, '1'=yellow). During a coding phase, these codes are determined using known coding techniques (such as Huffman coding). Note that in entropy coding, as would be understood by one skilled in the relevant art, code lengths are variable. In the above example, after detecting a '1' at the beginning of a coding sequence, the color would be determined to be yellow—the next bit of data would be the start of a new code. The code '0' at the beginning of a coding sequence simply reduces the possibilities to 'red' or 'blue', depending on the next bit of data.

This behavior is often included into data structures such as trees for ease of navigation. By way of example, a code sequence such as "1001010111011" would translate to 'yellow' (1), 'red' (00), 'yellow' (1), 'blue' (01), 'blue' (01), 'yellow' (1), 'yellow' (1), 'blue' (01), 'yellow' (1). The codes themselves (e.g., the data structure such as a tree) can be provided together with the encoded data as a prefix code list 102. Then, each pixel 104 comprises only as many bits of data as is needed to uniquely represent its prefix code.

A significant flaw of this approach is that the entire code sequence must necessarily be decoded serially. It is not possible to, for example, have a first processing thread decode the first X pixels, and a second processing thread decode the second Y pixels, because the divisions between pixels are unknown ahead of time. For example, jumping into the middle of the above example code sequence (e.g., '111011') and decoding it as per usual would produce 'yellow' (1) as the first value. However, that first '1' is, in reality, part of the '01' code for 'blue', but it is not possible to determine this without serially processing the entire sequence.

II. Parallelization Technique

As described above, the existing decoding technique must be handled serially. A previous pixel must be decoded in order to learn the information needed to decode a subsequent pixel. Accordingly, a technique is needed to eliminate this interdependency in order to achieve parallelism.

Figure 2:
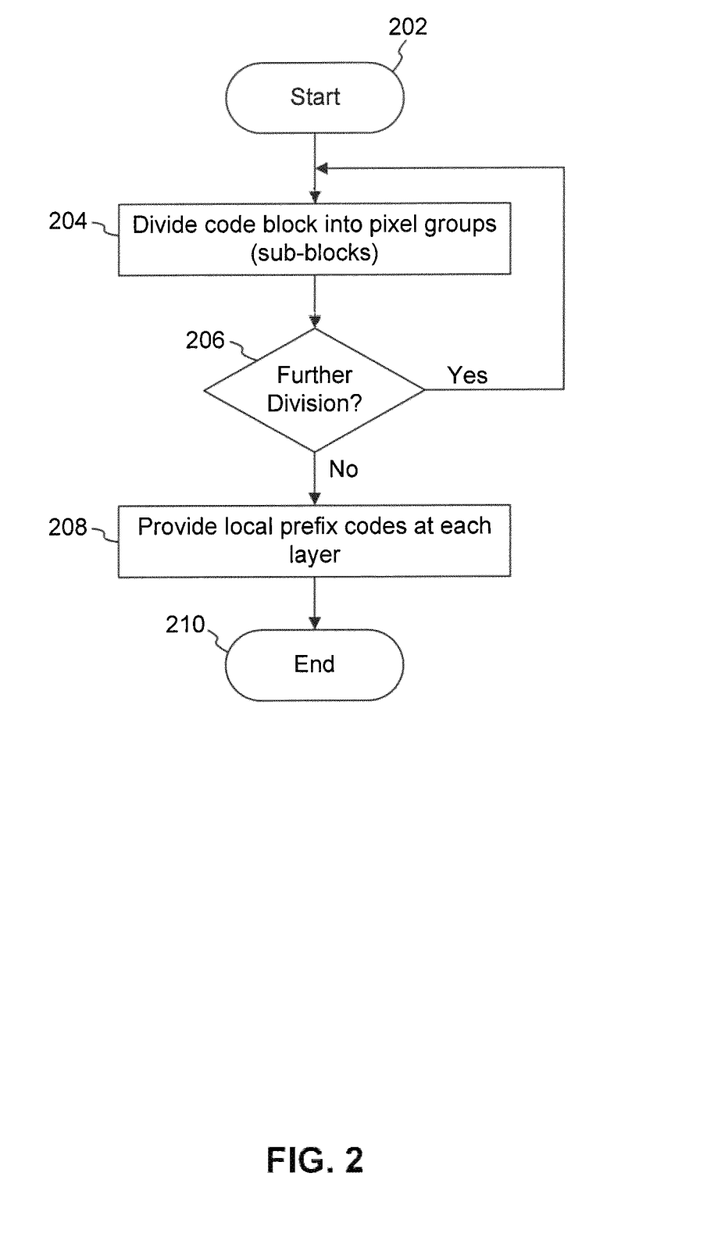
FIG. 2 is a flowchart of a process illustrating steps by which to eliminate code block interdependencies, in accordance with an embodiment of the present disclosure.

FIG. 2 is a flowchart of a process 200 illustrating steps by which to eliminate code block interdependencies, in accordance with an embodiment of the present disclosure. By way of example, and not limitation, code blocks (e.g., a 16×16 pixel block) are independent of other code blocks within a picture or sequence of pictures, although one skilled in the relevant arts would understand that the techniques described herein could be applied at any level (e.g., with interdependent code blocks within independent pictures, with interdependent pictures within independent streams, etc.).

The method begins at step 202 and proceeds to step 204 where a code block (e.g., a picture divided into 16×16 code blocks) is divided into pixel groups. For example, a complete picture may be divided into individual 16×16 code blocks, which in turn are divided into 8×8 pixel groups, and an 8×8 pixel group may be divided into four 4×4 pixel groups. At step 206, a determination is made as to whether to perform further division on the new pixel groups. If yes, the method proceeds to step 204 to further divide the pixel groups (e.g., each 4×4 pixel group may be further divided into four 2×2 pixel groups; four 4×1 pixel groups; a combination of one 2×1, one 2×3, and two 1×4 pixel groups; etc.). One skilled in the relevant arts will appreciate that the divisions performed at step 204 can be handled by a same module or by several different modules, as appropriate.

If no further division is requested, the method then proceeds to step 208 where local prefix codes are provided at each layer. The method then ends at step 210. Each division is named according to a layer number, in accordance with an embodiment of the present invention. The code blocks at the first level of division of an overall picture comprise "layer 0". The first set of pixel groups (e.g., the 8×8 pixel groups dividing a 16×16 code block) comprise "layer 1", and so on. In the above example, layers 0-3 are utilized.

III. Dividing Code Blocks

In accordance with an embodiment of the present disclosure, each code block comprises a set of quantized coefficients used to express pixel values within that block. One skilled in the relevant arts will appreciate that the code blocks can contain additional or different data, and the use of quantized coefficients is provided by way of example, and not limitation. Specifically, although coefficients are often quantized, they can be non-quantized. Accordingly, the disclosed embodiments are also contemplated to work with a set of non-quantized coefficients.

Code blocks are divided in accordance to "cluster patterns"—such that a 4×4 pixel group can be divided, as discussed above, into four 2×2 pixel groups, four 4×1 pixel groups, a combination of one 2×1, one 2×3, and two 1×4 pixel groups, or other patterns such as triangular, diagonal, or L-shaped patterns, in accordance with an embodiment of the present disclosure. Whatever pattern is used, an encoder will signal to a decoder which pattern(s) have been chosen by, for example, embedding the cluster pattern information in the prefix of a block or sub-block, or the pattern should otherwise be known ahead of time by the decoder.

Figure 3:
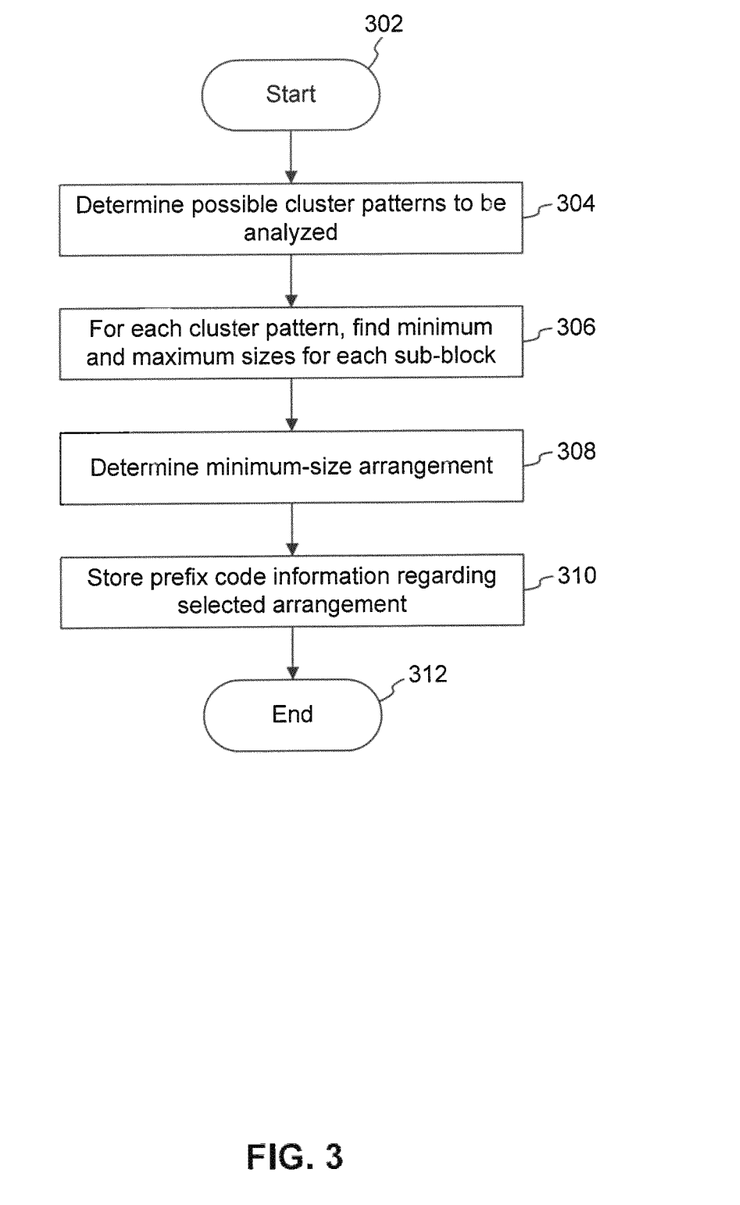
FIG. 3 is a flowchart of an encoding process illustrating steps by which a code block can be divided into pixel groups (sub-blocks), in accordance with an embodiment of the present disclosure.

FIG. 3 is a flowchart of an encoding process 300 illustrating steps by which a code block can be divided into pixel groups (sub-blocks), in accordance with an embodiment of the present disclosure. One skilled in the relevant arts will appreciate that various techniques can be applied at varying levels to segment blocks, and the techniques described herein are provided by way of example, and not limitation. For example, a 4×4 code block can be divided into four 2×2 blocks—an implementation may always opt to perform this particular division, or may utilize cluster patterns as described in further detail blow.

For the purposes of the examples outlined herein, a code block comprises several pixel groups ultimately divided into 4×4 blocks (e.g., 16×16 code blocks divided into 8×8 pixel groups, each divided into 4×4 pixel groups). The 4×4 blocks are each divided into further sub-blocks, as described below.

The method begins at step 302 and proceeds to step 304 where possible cluster patterns to be analyzed are determined. For example, if there is a choice between four 2×2 sub-blocks or four 4×1 sub-blocks, those are the two cluster patterns to be analyzed. One skilled in the relevant arts will appreciate that a number of cluster patterns may be available, and the patterns analyzed may comprise any subset of these patterns. Additionally, a particular pattern may be used without any analysis.

At step 306, minimum and maximum sizes for the sub-blocks are determined for a given cluster pattern. For example, with a cluster pattern of four 2×2 sub-blocks, the maximum code size to code each one of the sub-blocks is determined. Then, for the set of four 2×2 sub-blocks, the minimum code size (i.e., the code size for the individual sub-block with the smallest code size) is determined, along with the maximum code size (i.e., the code size of the individual sub-block with the largest code size).

Determining the code size for each sub-block is accomplished by finding the two's complement size of each quantized coefficient, in accordance with an embodiment of the present disclosure, although one skilled in the relevant arts will appreciate that this technique can be applied differently to other data, or a different technique can be used to find the code size of all quantized coefficients. The maximum and minimum sizes of the sub-blocks can be determined based on the bits needed to represent the quantized coefficients by application of a particular code. In accordance with an embodiment of the present invention, the code is chosen by one skilled in coding techniques to encode individual quantized coefficients. This information is used, as described above, to determine minimum and maximum sizes of the corresponding cluster pattern (i.e., the minimum and maximum code size of the set of sub-blocks).

The sizes of the various cluster patterns are compared with other cluster patterns in step 308. In accordance with an embodiment of the present disclosure, a cluster pattern from a set of available cluster patterns is selected based on minimizing the total bits for the block (e.g., the 4×4 block) by adding all code sizes for encoding all quantized coefficients and the prefix code size for encoding the cluster pattern. For example, a determination can be made that using four 2×2 sub-blocks would require fewer bits to represent the entire block than using four 4×1 sub-blocks.

At step 310, prefix code information regarding the selected arrangement is stored as described below, and the method ends at step 312. By way of non-limiting example, 1 to 4 bits are needed to code the difference between the max size of the coefficients of the upper-left 4×4 block and the max size of the coefficients of each sub-block within that 4×4 block, while 1 or 3 bits may be needed to code the above difference for the rest of the 4×4 blocks. The algorithm can use 2 bits for the upper-left 4×4 block to specify the number of bits which would be used to code the number of bits used to code above difference, i.e. the difference between the max size of the coefficients of the upper-left 4×4 block and the max size of the coefficients of each sub-block of the pattern within that 4×4 block, and 1 bit for the rest of the of the 4×4 blocks to specify the number of bits which would be used to code the number of bits used to code above difference, i.e. either 1 or 3 bits to be used to code the above difference of the rest of the 4×4 blocks.

In accordance with an embodiment of the present disclosure, the size (number of bits that would be used to encode) of a cluster (such as a 4×4 block) is coded as part of prefix in the upper layer (such as the 8×8 block that contains the 4×4 block), so that when a decoder decodes the bit stream, it is able to extract all of the bits that are used to encode that cluster in parallel with extracting all of the bits that are used to encode other clusters. The same idea is applied to the layer below the cluster level (e.g., the 4×4 block layer (layer 2) for the 2×2 sub-blocks (layer 3)) in the above example, such as four 2×2 sub-blocks that are composed of the cluster 4×4 block, where the number of bits that would be used to code each sub-block is coded as part of prefix in the 4×4 block.

Figure 4:
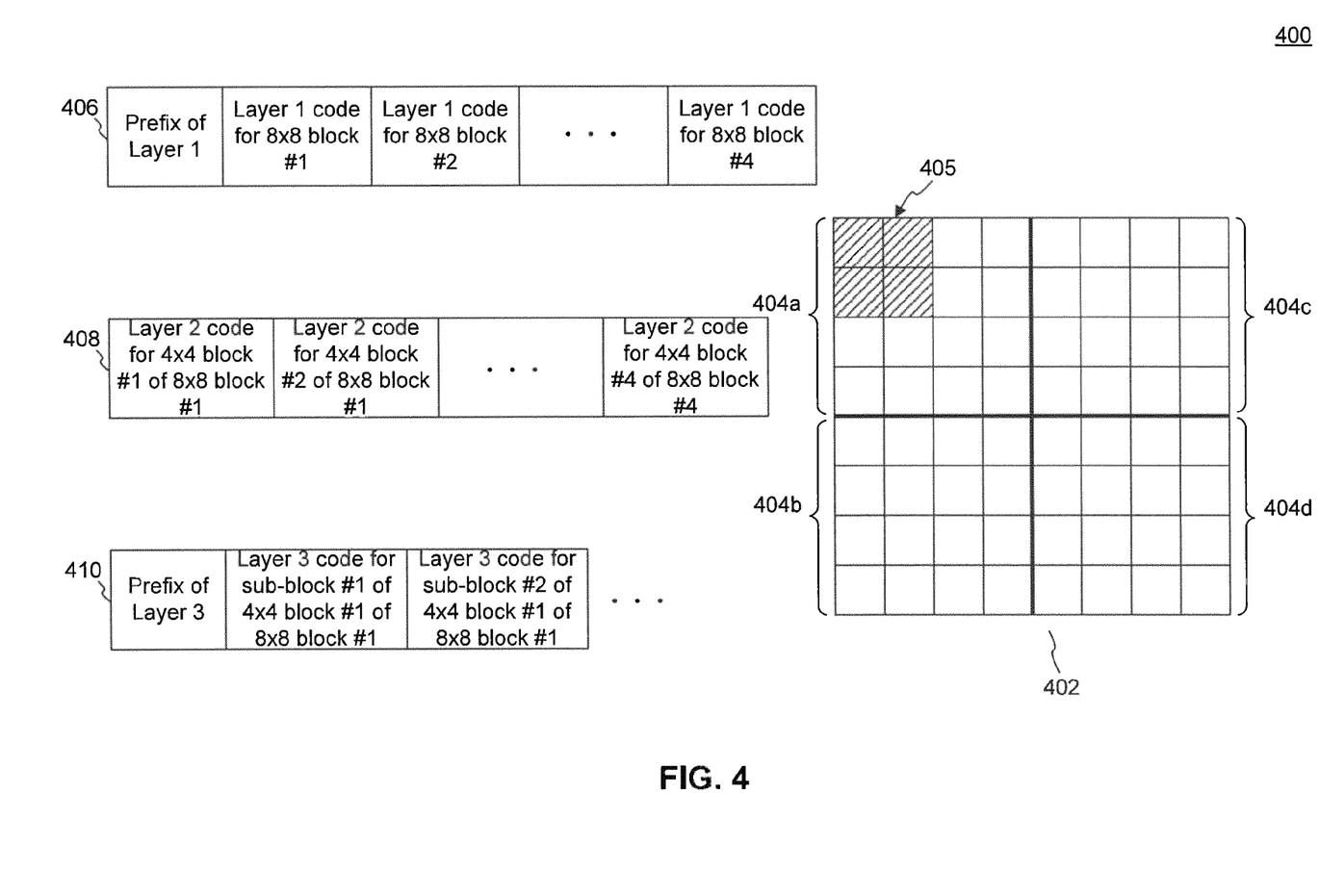
FIG. 4 illustrates a manner of dividing a code block into blocks and sub-blocks, in accordance with an embodiment of the present disclosure.

Turning to FIG. 4, an 8x8 code block 402 is shown divided into four 4×4 blocks, by way of non-limiting example consistent with an embodiment of the present disclosure. The four blocks, 404a, 404b, 404c, and 404d are each further divided into sub-blocks in accordance with a cluster or partition pattern, in accordance with an embodiment of the present disclosure.

In the case of block 404a, sub-block 405 is shown as a 2×2 block. In accordance with an embodiment of the present disclosure, all of the sub-blocks 405 of a block 404a are of a consistent size. After determining a maximum size of sub-block 405, as discussed above, it is compared to the maximum size of the other sub-blocks of block 404a to determine the maximum (and minimum) sizes of the sub-blocks. Consistent with the above example, the difference between the max size of block 404a and the max size of each sub-block may require anywhere between 1 to 4 bits for coding. Therefore, 2 bits are dedicated to specify how many bits (from 1 to 4) are needed to code the above difference.

A process to encode maximum size to that described in FIG. 3 is performed at the block level, where the max pattern size of each of the 4×4 blocks, i.e. 404a, 404b, 404c, 404d, is also encoded.

FIG. 4 shows, on the left-hand side of the diagram, what is termed the Parallel Pyramid Entropy Coding ("PPEC") algorithm, in accordance with an embodiment of the present disclosure. The name is from the notion that this diagram, were it to be expanded, would appear like a pyramid, with the encoded pixel data 410 as the base, sub-block data 408 as a middle layer, and block data 406 as a top layer. In each layer, all blocks or sub-blocks can be encoded and decoded in parallel.

As shown in FIG. 4, each sub-block comprises encoded pixel data. Each block comprises data, as described above, with the bits that define the number of bits used in coding the difference between the max size of the block and the maximum size of each sub-block within the block, and the bits that codes the above difference, along with the bits that code the sub-block data. The overall code block data comprises the maximum size of each block, along with the prefix codes (e.g., Hoffman coding scheme) used to encode pixel data. One skilled in the relevant arts will appreciate that while this diagram illustrates the various components discussed above, the components do not need to appear in the particular order shown in FIG. 4. Additionally, as previously discussed, additional layers can be introduced to provide finer divisions of sub-blocks and sub-sub-blocks. Moreover, a hybrid approach can be utilized where certain blocks are divided into sub-blocks, but other blocks are serially encoded without further division. One skilled in the relevant arts will appreciate that such variations and others are within the scope and spirit of this disclosure.

V. Decoder-Side Operation

The decoder size benefits greatly from the code blocks constructed in the aforementioned manner. In accordance with an embodiment of the present disclosure, a decoder operating on code blocks constructed in a manner consistent to the above description can process code blocks in parallel, and even individual sub-blocks can be processed in parallel.

In prior serial operation, each symbol within a code block had to be decoded in sequence. However, by breaking down the code block into layers as described herein, multiple symbols (e.g., pixel groups, character groups, or other groupings of decodable data) can be decoded in parallel, providing an improvement of an order of magnitude over serial processing solutions running at a comparable clock speed. Alternatively, the same processing speed can be obtained using a lower clock speed, resulting in energy efficiencies.

A decoder is constructed in order to parse the information included by an encoder as discussed above to separate blocks and sub-blocks from the overall code block. This means, for example, that the decoder should be able to understand how many layers of division are present in the code block, what cluster patterns are utilized, etc. All of this data is specified somewhere in a header block or spread out throughout the code block.

Figure 5:
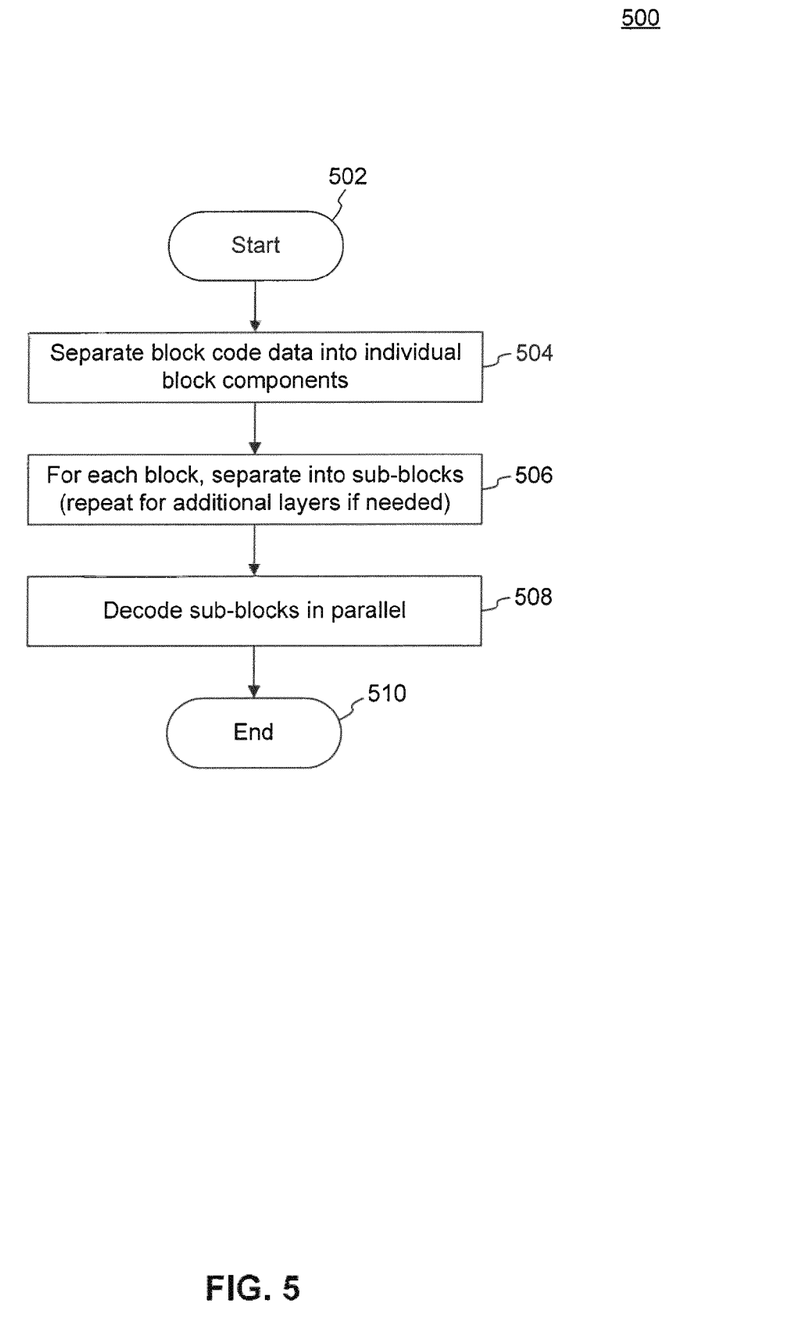
FIG. 5 is a flowchart of a process illustrating decoding steps, in accordance with an embodiment of the present disclosure.

FIG. 5 is a flowchart of a process 500 illustrating decoding steps, in accordance with an embodiment of the present disclosure. The method begins at step 502 and proceeds to step 504 where block code data is separated into individual block components (e.g., blocks 404a, 404b, 404c, and 404d of FIG. 4). At step 506, each block is further separated into sub-blocks (e.g., sub-block 405 of FIG. 4), in accordance with an embodiment of the present disclosure. Notably, the processing on each block at step 506 can be handled in parallel because the layer above (e.g., layer 1 for layer 2 decoding) defines the code size of the layer being decoded. Moreover, decoding each sub-block at step 508 is handled in parallel because the size of each sub-block is defined and already decoded. The method ends at step 510.

VI. Example Computer System Implementation

Figure 6:
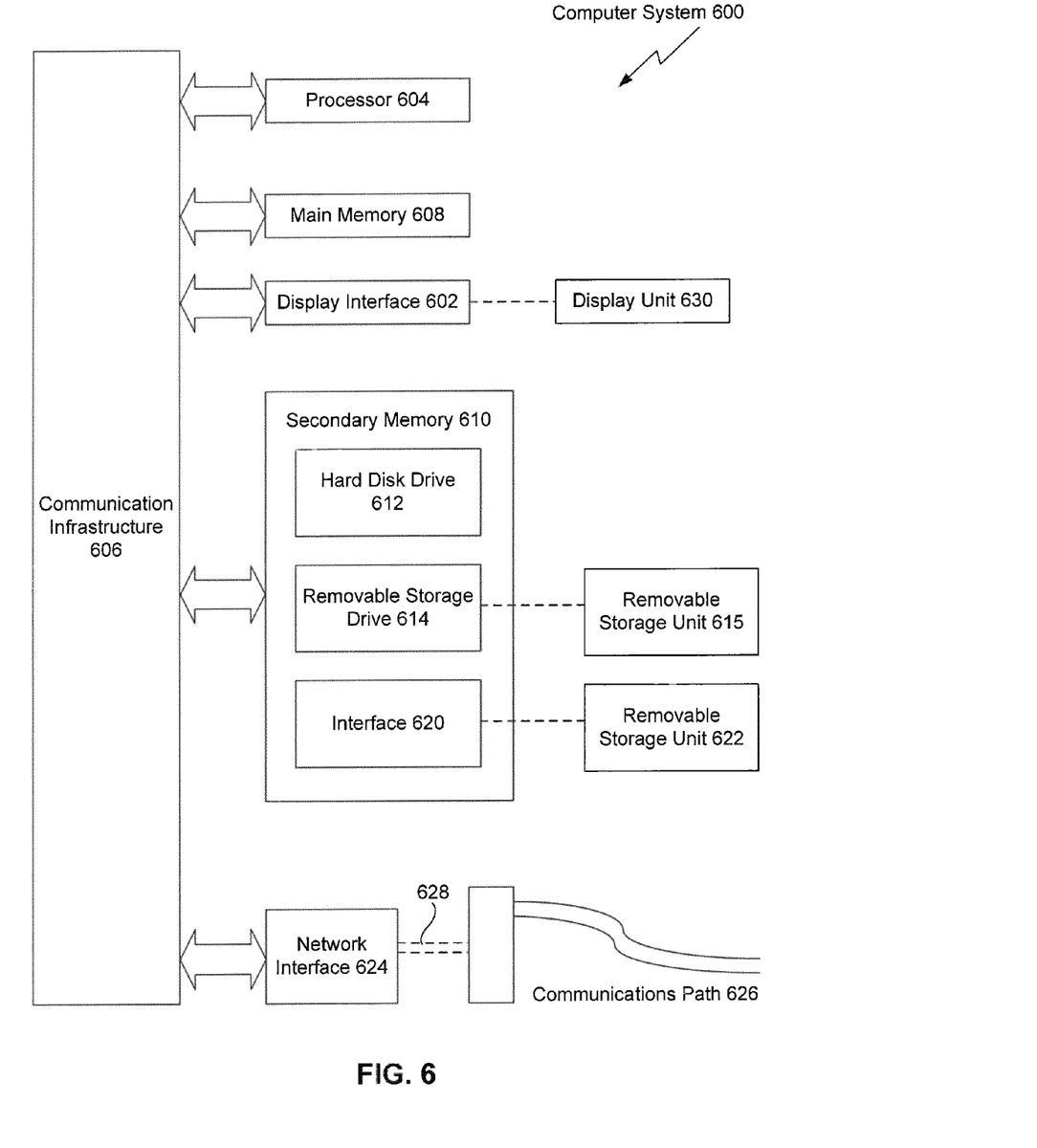
FIG. 6 depicts an example computer system in which embodiments of the present disclosure may be implemented.

Various aspects of the present disclosure can be implemented by software, firmware, hardware, or a combination thereof. FIG. 6 illustrates an example computer system 600 in which the present disclosure, or portions thereof, can be implemented as computer-readable code. For example, process 200 (FIG. 2), process 300 (FIG. 3), and process 500 (FIG. 5) can be implemented in system 600. Various embodiments of the disclosure are described in terms of this example computer system 600. After reading this description, it will become apparent to a person skilled in the relevant art how to implement the disclosure using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 615 in a well-known manner. Removable storage unit 615 may comprise a floppy disk, magnetic tape, optical disk, etc. that is read by and written to by removable storage drive 614. As will be appreciated by persons skilled in the relevant art(s), removable storage unit 615 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units such as removable storage unit 622 and interfaces such as interface 620 that allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals that may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 615, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present disclosure as discussed herein. In particular, the computer programs, when executed, enable processor 604 to implement the processes of the present disclosure, such as the steps in process 200 (FIG. 2), process 300 (FIG. 3), and process 500 (FIG. 5), discussed above. Accordingly, such computer programs represent controllers of the computer system 600. Where the disclosure is implemented using software, the software may be stored in a computer program product and loaded into computer system 600 using removable storage drive 614, interface 620, hard drive 612 or communications interface 624.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method, comprising:
dividing a code block into a plurality of pixel groups;
for a pixel group from the plurality of pixel groups, analyzing a first cluster pattern from a plurality of cluster patterns in a layered encoding scheme for the code block, wherein the first cluster pattern arranges the pixel group into sub-blocks, and wherein the analyzing comprises:
calculating maximum code sizes for encoding the sub-blocks according to the layered encoding scheme,
determining a largest code size of the maximum code sizes, and
calculating a prefix size of a prefix that encodes the maximum code sizes, wherein the maximum code sizes are encoded as differences from the largest code size;
determining that the first cluster pattern is associated with a first pixel group code size that is smaller than a second pixel group code size associated with a second cluster pattern from the plurality of cluster patterns, wherein the first pixel group code size is calculated based on the maximum code sizes and the prefix size;
selecting the first cluster pattern based on the determination;
dividing the pixel group into the sub-blocks according to the first cluster pattern; and
encoding the prefix and pixels assigned to the sub-blocks using the layered encoding scheme.

2. The method of claim 1, wherein the first cluster pattern divides the code block into four equal-sized pixel groups.

3. The method of claim 1, wherein the determination used in selecting the cluster pattern comprises:
determining a smallest code size of the maximum code sizes for the sub-block by using pixels assigned to the sub-block.

4. The method of claim 1, further comprising:
storing the maximum code sizes for the sub-blocks and pixel-group code sizes for the pixel groups into an encoded stream using the layered entropy coding scheme, wherein each of the maximum code sizes is stored as an encoded difference.

5. The method of claim 4, further comprising:
receiving a data stream comprising the code block;
separating the code block into pixel groups using the stored pixel-group code sizes and a layered decoding scheme;
separating the pixel group into the sub-blocks using the stored maximum code sizes; and
decoding the sub-blocks of the pixel group in parallel.

6. A computer-readable storage device having instructions stored thereon, execution of which, by a computing device, causes the computing device to perform operations comprising:
dividing a code block into a plurality of pixel groups;
for a pixel group from the plurality of pixel groups, analyzing a first cluster pattern from a plurality of cluster patterns in a layered encoding scheme for the code block, wherein the first cluster pattern arranges the pixel group into sub-blocks, and wherein the analyzing comprises:
calculating maximum code sizes for encoding the sub-blocks according to the layered encoding scheme,
determining a largest code size of the maximum code sizes, and
calculating a prefix size of a prefix that encodes the maximum code sizes, wherein the maximum code sizes are encoded as differences from the largest code size;
determining that the first cluster pattern is associated with a first pixel group code size that is smaller than a second pixel group code size associated with a second cluster pattern from the plurality of cluster patterns, wherein the first pixel group code size is calculated based on the maximum code sizes and the prefix size;
selecting the first cluster pattern based on the determination;
dividing the pixel group into the sub-blocks according to the first cluster pattern; and
encoding the prefix and pixels assigned to the sub-blocks using the layered encoding scheme.

7. The computer-readable storage device of claim 6, wherein the first cluster pattern divides the code block into four equal-sized pixel groups.

8. The computer-readable storage device of claim 6, wherein the determination used in selecting the cluster pattern comprises:
determining a smallest maximum code size from the maximum code sizes for the sub-block by using pixels assigned to the sub-block.

9. The computer-readable storage device of claim 6, the operations further comprising:
storing the maximum code sizes for the sub-blocks and pixel-group code sizes for the pixel groups into an encoded stream using the layered entropy coding scheme, wherein each of the maximum code sizes is stored as an encoded difference.

10. The computer-readable storage device of claim 9, the operations further comprising:
receiving a data stream comprising the code block;
separating the code block into pixel groups using the stored pixel-group code sizes and a layered decoding scheme;
separating the pixel group into the sub-blocks using the stored maximum code sizes; and
decoding the sub-blocks of the pixel group in parallel.

11. A system, comprising:
an encoder stored in memory and configured to perform operations comprising:
dividing a code block into a plurality of pixel groups;
for a pixel group from the plurality of pixel groups, analyzing a first cluster pattern from a plurality of cluster patterns in a layered encoding scheme for the code block, wherein the first cluster pattern arranges the pixel group into sub-blocks, and wherein the analyzing comprises:
calculating maximum code sizes for encoding the sub-blocks according to the layered encoding scheme,
determining a largest code size of the maximum code sizes, and
calculating a prefix size of a prefix for encoding the maximum code sizes, wherein the maximum code sizes are encoded as differences from the largest code size;
determining that the first cluster pattern is associated with a first pixel group code size that is smaller than a second pixel group code size associated with a second cluster pattern from the plurality of cluster patterns, wherein the first pixel group code size is calculated based on the maximum code sizes and the prefix size;
selecting the first cluster pattern based on the determination;

dividing the pixel group into the sub blocks according to the first cluster pattern; and encoding the prefix and pixels assigned to the sub-blocks using the layered encoding scheme; and one or more processors configured to process the encoder.

12. The system of claim 11, wherein the first cluster pattern divides the code block into four equal-sized pixel groups.

13. The system of claim 11, wherein the determination used in selecting the cluster pattern comprises:

determining a smallest maximum code size from the maximum code sizes for the sub-block by using pixels assigned to the sub-block.

14. The system of claim 11, wherein the encoder is further configured to perform operations comprising:

storing the maximum code sizes for the sub-blocks and pixel-group code sizes for the pixel groups into an encoded stream using the layered entropy coding scheme, wherein each of the maximum code sizes is stored as an encoded difference.

15. The system of claim 14, further comprising:

a decoder configured to perform operations comprising:

receiving a data stream comprising the code block, separating the code block into pixel groups using the stored pixel-group code sizes and a layered decoding scheme, separating the pixel group into the sub-blocks using the stored maximum code sizes, and decoding the sub-blocks of the pixel group in parallel.

16. The method of claim 1, further comprising:

encoding the difference between the maximum code size of a sub-block from the sub-blocks and another maximum code size of another sub-block from the sub-blocks.

17. The computer-readable storage device of claim 6, wherein the operations to be performed further comprise:

encoding the difference between the maximum code size of a sub-block from the sub-blocks and another maximum code size of another sub-block from the sub-blocks.

18. The system of claim 11, wherein the operations to be performed further comprise:

encoding the difference between the maximum code size of a sub-block from the sub blocks and another maximum code size of another sub-block from the sub-blocks.

19. The method of claim 1, wherein calculating maximum code sizes for the sub-blocks is based on finding a two's complement size of each pixel of the pixels assigned to the sub-blocks.

20. The computer-readable storage device of claim 6, wherein calculating maximum code sizes for the sub-blocks is based on finding a two's complement size of each pixel of the pixels assigned to the sub-blocks.

* * * * *

UNITED STATES PATENT AND TRADEMARK OFFICE
CERTIFICATE OF CORRECTION

PATENT NO.        : 9,106,932 B2  
APPLICATION NO.   : 13/408404  
DATED             : August 11, 2015  
INVENTOR(S)       : Lei Zhang Page 1 of 1

It is certified that error appears in the above-identified patent and that said Letters Patent is hereby corrected as shown below:

On the title page

Item 57, Line 3. Please replace "coefficient" with --coefficients--.

Item 57, Line 4. Please replace "using layered" with --using a layered--.

Signed and Sealed this
Fifth Day of January, 2016

Michelle K. Lee
*Director of the United States Patent and Trademark Office*